United States Patent
Wang et al.

(10) Patent No.: US 7,693,825 B2
(45) Date of Patent: Apr. 6, 2010

(54) SYSTEMS AND METHODS FOR RANKING IMPLICIT SEARCH RESULTS

(75) Inventors: Niniane Wang, Santa Clara, CA (US); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 559 days.

(21) Appl. No.: 10/813,875

(22) Filed: Mar. 31, 2004

(65) Prior Publication Data

US 2007/0276829 A1    Nov. 29, 2007

(51) Int. Cl.
*G06F 17/30*    (2006.01)
(52) U.S. Cl. .................... 707/3; 707/713; 707/723; 707/728; 707/731; 707/748
(58) Field of Classification Search .............. 707/100, 707/3, 7, 5
See application file for complete search history.

(56) References Cited

U.S. PATENT DOCUMENTS

| | | | |
|---|---|---|---|
| 5,418,948 A | | 5/1995 | Turtle |
| 5,678,038 A | | 10/1997 | Dockter et al. |
| 5,696,962 A | | 12/1997 | Kupiec |
| 5,701,469 A | | 12/1997 | Brandli et al. |
| 5,717,913 A | | 2/1998 | Driscoll |
| 5,754,938 A | | 5/1998 | Herz et al. |
| 5,826,261 A | * | 10/1998 | Spencer .................... 707/5 |
| 5,890,152 A | | 3/1999 | Rapaport et al. |
| 5,911,139 A | * | 6/1999 | Jain et al. .................... 707/3 |
| 5,933,827 A | | 8/1999 | Cole et al. |
| 5,940,821 A | | 8/1999 | Wical |
| 5,964,839 A | | 10/1999 | Johnson et al. |
| 5,987,446 A | * | 11/1999 | Corey et al. .................... 707/3 |
| 6,006,222 A | | 12/1999 | Culliss |
| 6,012,067 A | | 1/2000 | Sarkar |
| 6,014,665 A | * | 1/2000 | Culliss .................... 707/5 |
| 6,070,158 A | | 5/2000 | Kirsch et al. |
| RE36,727 E | * | 6/2000 | Kageneck et al. .............. 707/3 |
| 6,078,916 A | | 6/2000 | Culliss |
| 6,112,203 A | | 8/2000 | Bharat et al. |
| 6,122,647 A | * | 9/2000 | Horowitz et al. ............ 715/205 |
| 6,167,434 A | | 12/2000 | Pand |

(Continued)

OTHER PUBLICATIONS

U.S. Appl. No. 10/749,440, filed Dec. 31, 2003, Badros et al.

(Continued)

*Primary Examiner*—Don Wong
*Assistant Examiner*—Thanh-Ha Dang
(74) *Attorney, Agent, or Firm*—Fenwick & West LLP

(57) ABSTRACT

Systems and methods for ranking implicit search queries are described. In one embodiment a method comprising receiving an event, the event comprising user interaction with an article on a client device, wherein the article is capable of being associated with at least one of a plurality of client applications, extracting at least one keyword from the event, generating a query based at least in part on the at least one keyword, performing a search based at least in part on the query to determine a result set, wherein the result set comprises one or more article identifiers associated with articles comprising the at least one keyword, and determining a ranking for each of the one or more article identifiers comprising the result set is described.

56 Claims, 2 Drawing Sheets

U.S. PATENT DOCUMENTS

| | | | |
|---|---|---|---|
| 6,182,068 B1 | 1/2001 | Culliss | |
| 6,199,059 B1 | 3/2001 | Dahan et al. | |
| 6,272,507 B1* | 8/2001 | Pirolli et al. | 715/206 |
| 6,321,228 B1* | 11/2001 | Crandall et al. | 707/10 |
| 6,397,221 B1 | 5/2002 | Greef et al. | |
| 6,421,675 B1* | 7/2002 | Ryan et al. | 707/100 |
| 6,460,036 B1 | 10/2002 | Herz | |
| 6,473,752 B1* | 10/2002 | Fleming, III | 707/4 |
| 6,490,575 B1 | 12/2002 | Berstis | |
| 6,505,191 B1 | 1/2003 | Baclawski | |
| 6,546,388 B1* | 4/2003 | Edlund et al. | 707/5 |
| 6,571,234 B1* | 5/2003 | Knight et al. | 707/3 |
| 6,581,056 B1* | 6/2003 | Rao | 707/5 |
| 6,583,798 B1 | 6/2003 | Hoek et al. | |
| 6,587,856 B1 | 7/2003 | Srinivasan et al. | |
| 6,602,300 B2 | 8/2003 | Ushioda et al. | |
| 6,633,868 B1 | 10/2003 | Min et al. | |
| 6,665,666 B1 | 12/2003 | Brown et al. | |
| 6,687,704 B1 | 2/2004 | Russell | |
| 6,697,799 B1 | 2/2004 | Neal et al. | |
| 6,697,840 B1 | 2/2004 | Godefriod et al. | |
| 6,745,178 B1* | 6/2004 | Emens et al. | 707/3 |
| 6,766,320 B1 | 7/2004 | Wang et al. | |
| 6,772,188 B1 | 8/2004 | Cloutier | |
| 6,778,951 B1 | 8/2004 | Contractor | |
| 6,785,671 B1 | 8/2004 | Bailey et al. | |
| 6,795,825 B2 | 9/2004 | Rishe | |
| 6,803,906 B1 | 10/2004 | Morrison et al. | |
| 6,820,093 B2 | 11/2004 | de la Huerga | |
| 6,820,237 B1* | 11/2004 | Abu-Hakima et al. | 715/210 |
| 6,834,287 B1 | 12/2004 | Fold-Williams et al. | |
| 6,850,934 B2 | 2/2005 | Bates et al. | |
| 6,853,998 B2 | 2/2005 | Biebesheimer et al. | |
| 6,874,126 B1 | 3/2005 | Lapidous | |
| 6,948,134 B2 | 9/2005 | Gauthier et al. | |
| 6,950,791 B1 | 9/2005 | Bray et al. | |
| 6,961,910 B2 | 11/2005 | Lee et al. | |
| 6,961,954 B1 | 11/2005 | Maybury et al. | |
| 6,963,830 B1 | 11/2005 | Nakao | |
| 6,976,053 B1 | 12/2005 | Tripp et al. | |
| 6,976,090 B2 | 12/2005 | Ben-Shaul et al. | |
| 7,007,085 B1 | 2/2006 | Malik | |
| 7,022,905 B1 | 4/2006 | Hinman et al. | |
| 7,027,975 B1 | 4/2006 | Pazandak et al. | |
| 7,031,961 B2 | 4/2006 | Pitkow et al. | |
| 7,032,174 B2 | 4/2006 | Montero et al. | |
| 7,043,492 B1 | 5/2006 | Neal et al. | |
| 7,054,860 B2 | 5/2006 | Inaba et al. | |
| 7,054,870 B2 | 5/2006 | Holbrook | |
| 7,062,442 B2 | 6/2006 | Berg et al. | |
| 7,082,428 B1 | 7/2006 | Denny et al. | |
| 7,099,860 B1 | 8/2006 | Liu et al. | |
| 7,146,399 B2 | 12/2006 | Fox et al. | |
| 7,162,473 B2* | 1/2007 | Dumais et al. | 707/5 |
| 7,171,352 B2 | 1/2007 | Chang et al. | |
| 7,181,459 B2 | 2/2007 | Grant et al. | |
| 7,194,455 B2 | 3/2007 | Zhou et al. | |
| 7,194,485 B2 | 3/2007 | Kaipa et al. | |
| 7,231,395 B2 | 6/2007 | Fain et al. | |
| 7,293,014 B2 | 11/2007 | Subramaniam et al. | |
| 7,305,129 B2 | 12/2007 | Chellapilla et al. | |
| 7,318,049 B2 | 1/2008 | Iannacci | |
| 7,412,708 B1 | 8/2008 | Khan et al. | |
| 7,421,645 B2 | 9/2008 | Reynar | |
| 7,437,353 B2 | 10/2008 | Marmarmos et al. | |
| 7,451,136 B2 | 11/2008 | Chua et al. | |
| 7,478,089 B2 | 1/2009 | Henkin et al. | |
| 2001/0037328 A1 | 11/2001 | Pustejovsky et al. | |
| 2001/0037377 A1* | 11/2001 | Nakano et al. | 709/219 |
| 2002/0016786 A1 | 2/2002 | Pitkow et al. | |
| 2002/0040311 A1* | 4/2002 | Douglass et al. | 705/7 |
| 2002/0059272 A1* | 5/2002 | Porter | 707/100 |
| 2002/0065800 A1 | 5/2002 | Morlitz | |
| 2002/0095427 A1 | 7/2002 | Kaplan | |
| 2002/0099700 A1* | 7/2002 | Li | 707/5 |
| 2002/0103698 A1 | 8/2002 | Cantrell | |
| 2002/0103737 A1 | 8/2002 | Briere | |
| 2002/0103806 A1 | 8/2002 | Yamanoue | |
| 2002/0116291 A1 | 8/2002 | Grasso et al. | |
| 2002/0129059 A1 | 9/2002 | Eck | |
| 2002/0174101 A1* | 11/2002 | Fernley et al. | 707/1 |
| 2003/0014398 A1* | 1/2003 | Ohta et al. | 707/3 |
| 2003/0020749 A1* | 1/2003 | Abu-Hakima et al. | 345/752 |
| 2003/0033296 A1 | 2/2003 | Rothmuller et al. | |
| 2003/0046311 A1* | 3/2003 | Baidya et al. | 707/200 |
| 2003/0055831 A1* | 3/2003 | Ryan et al. | 707/100 |
| 2003/0069877 A1 | 4/2003 | Grefenstette et al. | |
| 2003/0079185 A1 | 4/2003 | Katariya et al. | |
| 2003/0093276 A1* | 5/2003 | Miller et al. | 704/257 |
| 2003/0093790 A1* | 5/2003 | Logan et al. | 725/38 |
| 2003/0115552 A1* | 6/2003 | Jahnke et al. | 715/536 |
| 2003/0123443 A1* | 7/2003 | Anwar | 370/392 |
| 2003/0130982 A1 | 7/2003 | Kasriel et al. | |
| 2003/0135490 A1 | 7/2003 | Barrett et al. | |
| 2003/0135499 A1 | 7/2003 | Schirmer et al. | |
| 2003/0154071 A1 | 8/2003 | Shreve | |
| 2003/0158855 A1 | 8/2003 | Farnham et al. | |
| 2003/0167266 A1 | 9/2003 | Saldanha et al. | |
| 2003/0220913 A1* | 11/2003 | Doganata et al. | 707/3 |
| 2004/0001104 A1 | 1/2004 | Sommerer et al. | |
| 2004/0003097 A1 | 1/2004 | Willis et al. | |
| 2004/0030741 A1 | 2/2004 | Wolton et al. | |
| 2004/0036716 A1 | 2/2004 | Jordahl | |
| 2004/0059564 A1 | 3/2004 | Zhou | |
| 2004/0059730 A1* | 3/2004 | Zhou | 707/4 |
| 2004/0064447 A1 | 4/2004 | Simske et al. | |
| 2004/0068486 A1 | 4/2004 | Childovskii | |
| 2004/0073534 A1 | 4/2004 | Robson | |
| 2004/0122656 A1 | 6/2004 | Abir | |
| 2004/0133560 A1* | 7/2004 | Simske | 707/3 |
| 2004/0139106 A1* | 7/2004 | Bachman et al. | 707/104.1 |
| 2004/0143569 A1* | 7/2004 | Gross et al. | 707/3 |
| 2004/0225667 A1 | 11/2004 | Hu et al. | |
| 2004/0267700 A1 | 12/2004 | Dumais et al. | |
| 2004/0267730 A1* | 12/2004 | Dumais et al. | 707/3 |
| 2004/0267813 A1 | 12/2004 | Rivers-Moore et al. | |
| 2005/0065909 A1 | 3/2005 | Musgrove et al. | |
| 2005/0114306 A1 | 5/2005 | Shu et al. | |
| 2005/0125382 A1 | 6/2005 | Karnawat et al. | |
| 2005/0125390 A1* | 6/2005 | Hurst-Hiller et al. | 707/3 |
| 2005/0198026 A1 | 9/2005 | Dehlinger et al. | |
| 2005/0222987 A1 | 10/2005 | Vadon | |
| 2005/0262073 A1 | 11/2005 | Reed | |
| 2006/0010150 A1 | 1/2006 | Shaath et al. | |
| 2006/0136405 A1* | 6/2006 | Ducatel et al. | 707/4 |

OTHER PUBLICATIONS 80-20 Software—Products—80-20 One Search, http://www.80-20.com/products/one-search/retriever.asp, printed Mar. 16, 2004.

"askSam™ Making Information Useful," askSam,—Organize your Information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

DEVONthink, http://www.devon-techonologies.com/products/devonthink.php, printed Mar. 16, 2004.

dtSearch®—http://www.dtsearch.com/, printed Mar. 15, 2004.

Dumais, S., et al, "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e..., pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rhodes, B., et al., "Remembrance Agent—A continuously running automated information retrieval system," *The Proceedings of the First International Conference on the Practical Application of Intelligent Agents and Multi Agent Technology* (PAAM '98), pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

Berlin, J., et al., "Database Schema Matching Using Machine Learning with Feature Selection," CAISE 2002, LNCS 2348, pp. 452-466, http://www.springerlink.com/contant/73u6cpt0qek8rgh0/.

Brill, E., "A Simple Rule-Based Part of Speech Tagger," Department of Computer Science, University of Pennsylvania, 1992, pp. 1-5.

Claypool, M., et al., "Inferring User Interest," IEEE Internet Computing, 2001, pp. 1-17, vol. 5, No. 6, located at http://web.cs.wpi.edu/~claypool/papers/iui/iui.pdf.

Czerwinski, M., et al., "Visualizing Implicit Queries for Information Management and Retrieval," ACM CHI '99, May 15-20, 1999, pp. 560-567.

Knezevic, P. et al., "The Architecture Of The Obelix—An Improved Internet Search Engine," Proceedings of the 33rd Annual Hawaii International Conference on System Sciences (HICSS) Jan. 4-7, 2000, Maui, HI, USA, pp. 2145-2155.

Li, W., et al., "Semantic Integration in Heterogeneous Databases Using Neural Networks," Proceedings of the 20th International Conference on Very Large Data Bases, Sep. 12-15, 1994, pp. 1-12, Morgan Kaufmann Publishers, San Francisco, CA.

Li, W., et al., "SEMINT: A Tool for Identifying Attribute Correspondences in Heterogeneous Databases Using Neural Networks," Data Knowl. Eng., Apr. 2000, pp. 484, vol. 33, No. 1, http://dx.doi.org/10.1016/S0169-023X(99)00044-0.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

Phelps, A., "All You Can Seek," Special Services, Jul. 1999, vol. 7, Iss. 7, [online] [Retrieved on Oct. 16, 2006] Retrieved from the Internet: http://www.smartcomputing.com/editorial/article.asp?article=articles/archive/g0707/26g07/26g07.asp.

Scha, R., et al., "An Augmented Context Free Grammar for Discourse," Proceedings of the 12th Conference on Computational Linguistics—vol. 2, Computational Linguistics, Aug. 22-27, 1988, pp. 573-577, Morristown, NJ, http://dx.doi.org/10.3115/991719.991756.

International Search Report and Written Opinion, PCT/US2004/038562, Apr. 6, 2005, 12 pages.

Chen, H., et al., "Bringing Order to the Web: Automatically Categorizing Search Results," Proceedings of the SIGCHI Conference on Human Factors in Computing Systems, Apr. 2000, p. 145-152.

Garofalakis, M., et al., "XTRACT: A System for Extracting Document Type Descriptors from XML Documents," SIGMOD, ACM, Jun. 2000, p. 165-176, vol. 29, No. 2.

Horvitz, E., et al., "The Lumiere project: Bayesian user modeling for inferring the goals and needs of software users", Proceedings of the Fourteenth Conference on Uncertainty, 1998, pp. 256-265, Morgan Kaufmann: San Francisco.

Joho, H., et al., "A Study of User Interaction with a Concept-Based Interactive Query Expansion Support Tool," Advances in Information Retrieval, A Study of User Interaction, Lecture Notes in Computer Science, Mar. 2, 2004, pp. 42-56, vol. 2997.

Jones, G., et al., "Context-Aware Retrieval for Ubiquitous Computing Environments," Mobile and Ubiquitous Information Access, Lecture Notes in Computer Science, Jan. 27, 2004, pp. 227-243, vol. 2954.

Pasca, M., "Acquisition of Categorized Named Entities for Web Search," Proceedings of the 13th ACM International Conference on Information and Knowledge Management, Nov. 2004, pp. 137-145.

Shedherd, M., et al., "Browsing and Keyword-Based Profiles: A Cautionary Tale," Proceedings of the 34th Hawaii International Conference on System Sciences, Jan. 3-6, 2001, pp. 1365-1373.

White, R., et al., "The Use of Implicit Evidence for Relevance Feedback in Web Retrieval," Lecture Notes in Computer Science, Jan. 1, 2002, pp. 93-109, vol. 2291.

* cited by examiner

US 7,693,825 B2

SYSTEMS AND METHODS FOR RANKING IMPLICIT SEARCH RESULTS

FIELD OF THE INVENTION

The present invention relates generally to methods and systems for information retrieval. The present invention relates particularly to methods and systems for ranking implicit search results.

BACKGROUND

Conventional search engines receive a search query from a user and execute a search against a global index. Such conventional search engines typically use one or more conventional methods for performing a search. For example, one known method, described in an article entitled "The Anatomy of a Large-Scale Hypertextual Search Engine," by Sergey Brin and Lawrence Page, assigns a degree of importance to a document, such as a web page, based on the link structure of the web. The search results are often presented in a list format, comprising article identifiers and brief snippets about the documents in a web page that can be resized.

Often, the user has access to other information stored on the user's local machine or on other storage media accessible via a network that is relevant to the user's current contextual state. For example, if a user is working on a document regarding a particular subject, information about the subject may be stored on the user's hard drive or in a global index accessible to the user. In order to access this information, the user issues an explicit search query in an application, such as a web search page. The information is provided to the user as a result set. Thus, the user shifts focus from the document that the user is working on to perform the search.

In many cases, the user may be unaware or may not remember that information is available regarding a particular subject. In such a case, the user may not perform an explicit search and thus, will not have access to the potentially relevant information.

SUMMARY

Embodiments of the present invention provide systems and methods for ranking implicit search results. In one embodiment, a method comprising receiving an event, the event comprising user interaction with an article on a client device, wherein the article is capable of being associated with at least one of a plurality of client applications, extracting at least one keyword from the event, generating a query based at least in part on at least that one keyword, performing a search based at least in part on the query to determine a result set, wherein the result set comprises one or more article identifiers associated with articles comprising the at least one keyword, and determining a ranking for each of the one or more article identifiers comprising the result set is described.

Another embodiment of the present invention comprises receiving an event, the event comprising user interaction with an article on a client device, wherein the article is capable of being associated with at least one of a plurality of client applications, extracting at least one keyword from the event, generating a query based at least in part on the at least one keyword, performing a search based at least in part on the query to determine a result set, wherein the result set comprises one or more article identifiers associated with articles comprising the at least one keyword, filtering the article identifiers in the result set based on a threshold, and causing the display of the result set.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for ranking implicit search results.

System Architecture

Figure 1:
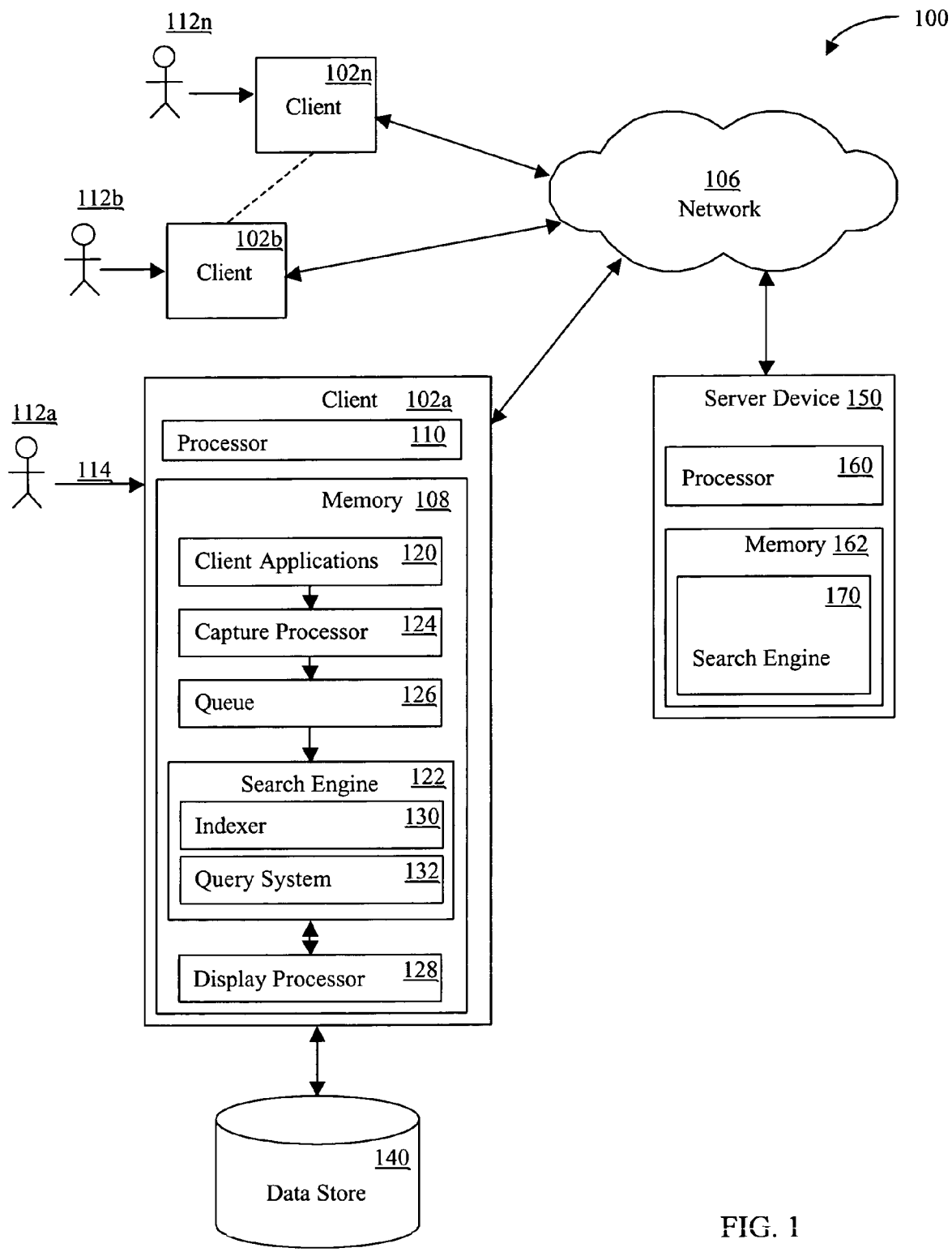
FIG. 1 is a block diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown reflects a client-side search engine architecture embodiment, other embodiments are possible.

The system 100 shown in FIG. 1 includes multiple client devices 102a-n in communication with a server device 150 over a wired or wireless network 106. The network 106 shown comprises the Internet. In other embodiments, other networks, such as an intranet, may be used instead. Moreover, methods according to the present invention may operate within a single client device.

The client devices 102a-n shown each includes a computer-readable medium 108. The embodiment shown includes a random access memory (RAM) 108 coupled to a processor 110. The processor 110 executes computer-executable program instructions stored in memory 108. Such processors may include a microprocessor, an ASIC, a state machine, or other processor, and can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be connected to a network 106 as shown, or can be stand-alone machines. Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any operating system, such as Microsoft® Windows® or Linux, capable of supporting one or more client application programs. For example, the client device 102a shown comprises a personal computer executing client application programs, also known as client applications 120. The client applications 120 can be contained in memory 108 and can include, for example, a word processing application, a spreadsheet application, an e-mail application, an instant messenger application, a presentation application, an Internet browser application, a calendar/organizer application, and any other application capable of being executed by a client device.

The user 112a can interact with the various client applications 120 and articles associated with the client applications 120 via various input and output devices of the client device 102a. Articles include, for example, word processor, spreadsheet, presentation, e-mail, instant messenger, database, and other client application program content files or groups of files, web pages of various formats, such as HTML, XML, XHTML, Portable Document Format (PDF) files, and audio files, video files, or any other documents or groups of documents or information of any type whatsoever.

The memory 108 of the client device 102a shown also contains a capture processor 124, a queue 126, and a search engine 122. The client device 102a shown also contains or is in communication with a data store 140. The search engine 122 can receive an explicit query from the user 112a or generate an implicit query and retrieve information from the data store 140 in response to the query.

The search engine 122 shown contains an indexer 130, a query system 132, and a formatter 134. Events, real-time and historical, contextual and indexable, and performance data can be sent by the queue 126 to the query system 132 to provide the query system 132 with information concerning current user context. The query system 132 can use this information to generate an implicit query. The query system 132 can also receive and process explicit queries from the user 112a.

The user context attribute may comprise, for example, the current word in a buffer, the last n words received from the user (e.g., the last 10 words the user typed), the text nearby the cursor (e.g., the text up to x words before and y words after), the current sentence, the current paragraph, an entire buffer (e.g., an entire word-processing document), the selected or highlighted buffer, the buffer currently in the clipboard, a term measure, such as a term frequency or inverse document frequency measure, an identified term, such as an e-mail address, the name of a person, or an instant messaging buddy name, a previously copied term, a prior implicit or explicit search term, a user identifier, or a word determined by rules specific to the application that generated the event, such as a web page URL for a web browser application.

The data store 140 can be any type of computer-readable media and can be integrated with the client device 102a, such as a hard drive, or external to the client device 102a, such as an external hard drive or on another data storage device accessed through the network 106. The data store 140 may include any one or combination of methods for storing data, including without limitation, arrays, hash tables, lists, and pairs.

In the embodiment shown in FIG. 1, a user 112a can input an explicit query into a search engine interface displayed on the client device 102a, which is received by the search engine 122. The search engine 122 can also generate an implicit query based on a current user context or state, which can be determined by the query system 132 from contextual real time events. Based on the query, the query system 132 can locate relevant information in the data store 140 and provide a result set. In one embodiment, the result set comprises article identifiers identifying articles associated with the client applications 120 or client articles. Client articles stored in the data store 140 include articles associated with the user 112a or client device 102a, such as the word processing documents, previously viewed web pages and any other article associated with the client device 102a or user 112a. In another embodiment, the result set also comprises identifiers identifying articles located on the network 106 or network articles located by a search engine on a server device. Network articles include articles located on the network 106 not previously viewed or otherwise referenced by the user 112a, such as web pages not previously viewed by the user 112a.

The result sets comprise one or more article identifiers. An article identifier may be, for example, a Uniform Resource Locator (URL), a file name, a link, an icon, a path for a local file, or any other suitable item that identifies an article. In the embodiment shown, an article identifier comprises a URL associated with an article.

Messaging articles stored in the data store 140 include user's e-mails, chat messages, and instant messaging messages. Each time a message is received, sent, modified, printed, or otherwise accessed, a record is stored in the data store 140. This information can later be searched to identify messages that should be displayed in a user interface element.

An embodiment of the present invention may also store message threads in the data store 140. In such an embodiment, messages are related together by various attributes, including, for example, the sender, recipient, date/time sent and received, the subject, the content, a window identifier of the display window in which the messages were displayed, or any other attribute of the message. The related messages can then be retrieved as a thread, which may be treated as a document by the display processor 128.

The formatter 134 can receive the search result set from the query system 132 of the search engine 122 and can format the results for output to a display processor 128. In one embodiment, the formatter 134 formats the results in XML or HTML. In another embodiment, the formatter 134 displays the results as strings on user interface components such as, for example, labels. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. In various embodiments, the functions described herein may be performed by various other components and devices.

Through the client devices 102a-n, users 112a-n can communicate over the network 106, with each other and with other systems and devices coupled to the network 106. As shown in FIG. 1, a server device 150 is also coupled to the network 106. In the embodiment shown, the search engine 122 can transmit a search query comprised of an explicit or implicit query or both to the server device 150. The user 112a can also enter a search query in a search engine interface, which can be transmitted to the server device 150. In another embodiment, the query signal may instead be sent to a proxy server (not shown), which then transmits the query signal to server device 150. Other configurations are also possible.

The server device 150 shown includes a server executing a search engine application program, such as the Google™ search engine. Similar to the client devices 102a-n, the server device 150 shown includes a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill.

Memory 162 contains the search engine application program, also known as a search engine 170. The search engine 170 locates relevant information in response to a search query from a client device 102a. The search engine 122 then provides the result set to the client device 102a via the network 106. The result set 134 comprises one or more article identifiers. An article identifier may be, for example, a uniform resource locator (URL), a file name, a link, an icon, a path for a local file, or anything else that identifies an article. In the embodiment shown, an article identifier comprises a URL associated with an article.

In the embodiment shown, the server device 150, or related device, has previously performed a crawl of the network 106 to locate articles, such as web pages, stored at other devices or systems connected to the network 106, and indexed the articles in memory 162 or on another data storage device.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to explain the exemplary methods shown in FIG. 2.

Various methods may be implemented in the environment shown in FIG. 1 and other environments, according to the present invention. Methods according to the present invention may be implemented by, for example, a processor-executable program code stored on a computer-readable medium.

Embodiments of the present invention are capable of generating implicit queries based on a user's contextual state. The results of an implicit query are displayed to the user in a content display window. The results may be updated periodically as the user's contextual state changes. For example, in one embodiment, the user is working on a word document concerning budgeting. A query implicit builder ("QUIB"), one component of the query system 132 shown in FIG. 1, requests and receives events related to the document. The QUIB generates queries from the events and presents the results of the queries to the user.

Events comprise historical, contextual, and real-time events. In one embodiment, contextual events are time sensitive and may be of higher significance even after an elapsed period of time. Contextual events relate to actions that are occurring now or have occurred within a short time frame, e.g., the last ten words that the user typed. In contrast, real-time events are less time-sensitive, e.g., the user printed or opened a file.

Events may be tracked over multiple sessions. For example, in one embodiment, if a user has opened a web page repeatedly during the last several times the user has used a client machine, the query system 132 tracks the usage for each of those sessions by tracking the events associated with the usage. In one such embodiment, access during a particular session is down-weighted or promoted based on the period of time that has elapsed since the session. In other words, events associated with more recent accesses of a specific article are weighted more heavily than those occurring less recently.

The events may include information, such as the last twenty words the user typed, the last sentence the user typed, the text nearby the cursor (e.g. the text up to x words before and y words after), the currently active buffer (e.g., the entire active document), the selected or highlighted buffer, the buffer in the clipboard, or other information relevant to the user's context. The query system 132 extracts keywords from the information and generates a search query to be submitted to a search engine. The query system 132 creates and executes the query as if the user had explicitly typed the keywords in a search interface.

In one embodiment, the query system 132 learns from a user's behavior whether or not certain data streams or keywords are particularly relevant. The query system 132 may rely on click-throughs within the content display window to determine results in which the user exhibits particular interest. For example, if the content display includes a link that has been shown to a user multiple times but has not been clicked, the link may be eliminated from the content display. The data streams, query types, or keywords that resulted in the link being displayed may be down-weighted in subsequent analysis. In contrast, if the user clicks the link, this typically indicates that the user is interested in the article, and can result in promoting the data streams, query types, or keywords that resulted in the link being displayed. These data streams, query types, or keywords can be used with increased weight in subsequent analysis. Additionally, click-through data can be used to identify a type preference for the user 112a. A type preference can comprise, for example, a file format preferred by the user 112a. For example, if the user 112a typically selects results that are in HTML format and ignores results that are in PDF format, the query system 132 can promote future identifiers associated with articles in HTML format and down-weight articles in PDF format. Click-through data can also be used to identify a preference for a particular method of generating keywords. For example, if the user 112a typically selects results that were generated based on the most recently typed 10 words and ignores results generated based on text on the clipboard, the query system 132 can promote future identifiers associated with articles generated from the most recently typed 10 words, and down-weight articles associated with text from the clipboard.

The query system 132 shown in FIG. 1 utilizes multiple data streams as sources for generating search queries. For example, if the user is editing a document, the query system 132 may use the last 20 words that were typed, as well as the entire document to extract keywords and generate search queries. The query system 132 generates a search query for each data stream and combines the result sets corresponding to each search query for display to the user.

Processes

Various methods in accordance with the present invention may be carried out. For example, one embodiment comprises receiving an event, the event comprising user interaction with an article on a client device, wherein the article is capable of being associated with at least one of a plurality of client applications, extracting at least one keyword from the event generating a query based at least in part on the at least one keyword performing a search based at least in part on the query to determine a result set, wherein the result set comprises one or more article identifiers associated with articles comprising the at least one keyword, and determining a ranking for each of the one or more article identifiers comprising the result set. According to some embodiments, ranking the article identifiers can be based at least in part on a user preference. The user preference can be based at least in part on click-through data or file type.

According to other embodiments, ranking the article identifiers can be based at least in part on meta-data. The meta-data can comprise at least one of bolding, highlighting, italicizing, font color, or heading data. According to other embodiments, ranking the article identifiers is based at least in part on a term frequency and a document frequency. The ranking can be proportional to the log of the sum of a first constant plus the term frequency and inversely proportional to the log of the sum of a second constant plus the document frequency. In one embodiment, both the first and second constants have the value one. In another embodiment, they have different values. In yet another embodiment, the document frequency is not used directly but is hashed into a pre-defined table which maps ranges of document frequency into constants used for ranking article identifiers. According to other embodiments, the ranking is based at least in part on a number data. The number data can comprise a number of letters in the keyword or whether a keyword comprises numbers. According to other embodiments, the ranking is based at least in part on capitalization data. According to other embodiments, the ranking is based at least in part on source data. According to other embodiments, the keywords can be associated with keyword ranking scores. According to some embodiments, the ranking of article identifiers can be based at least in part on the keyword ranking scores. According to some embodiments, ranking the article identifiers can comprise assigning a higher ranking to article identifiers associated with articles containing higher ranked keywords.

According to other embodiments, extracting at least one keyword from an event comprises extracting a keyword from at least one of recently typed words, an entire document, a selected portion of a document, or words surrounding a cursor. According to other embodiments, extracting at least one keyword from an event comprises determining names. Determining names can comprise crawling at least one article.

According to other embodiments, a method comprises receiving an event, the event comprising user interaction with an article on a client device, wherein the article is capable of being associated with at least one of a plurality of client applications, extracting at least one keyword from the event, generating a query based at least in part on the at least one keyword, performing a search based at least in part on the query to determine a result set, wherein the result set comprises one or more article identifiers associated with articles comprising the at least one keyword, filtering the article identifiers in the result set based on a threshold, and causing the display of the result set. The threshold can comprise a number of keywords or a minimum weighting score. The minimum weighting score can be based at least in part on a number of keywords multiplier, a source multiplier, and a time multiplier.

Figure 2:
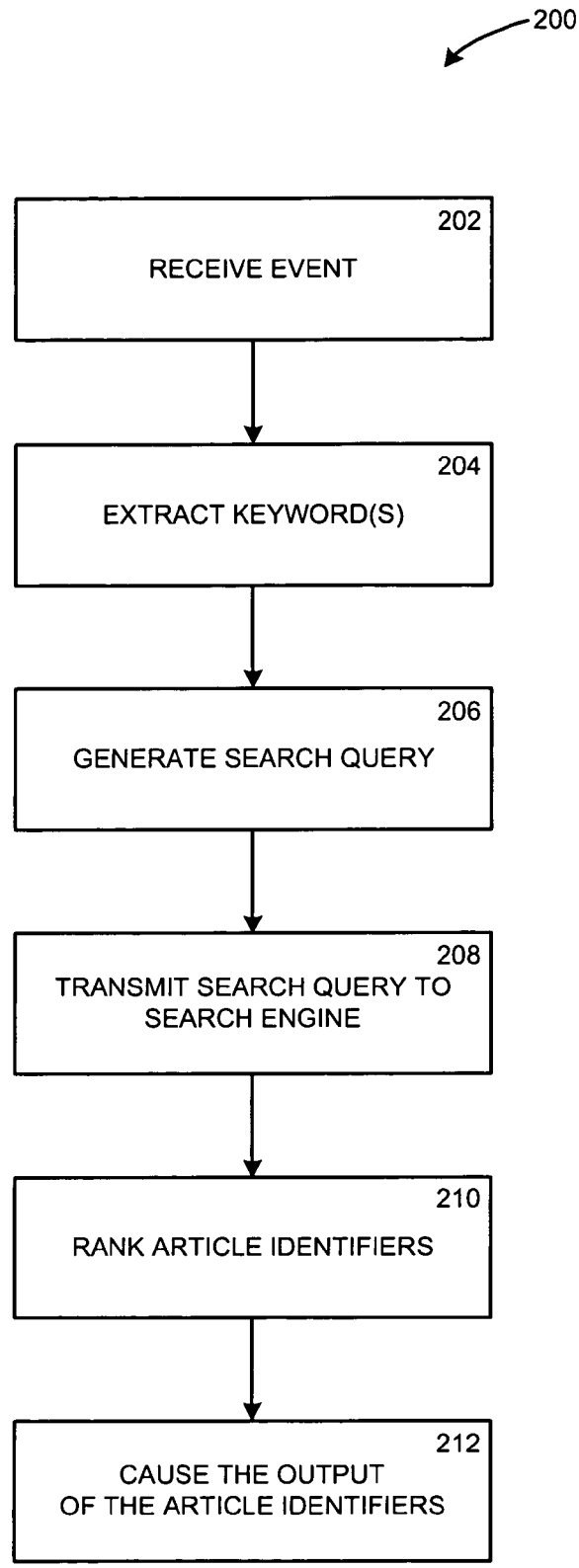
FIG. 2 is a flowchart illustrating a method in accordance with one embodiment of the present invention.

FIG. 2 is a flowchart illustrating a method 200 for processing an implicit query. The method 200 begins in block 202, wherein the query system 132 receives a contextual event 202. The contextual event is an occurrence that is captured by the capture processor 124 and can be used to update the user's contextual state and can be indexed and stored in the event database in data store 140 to provide information for future queries.

Once the query system 132 receives a contextual event, the method 200 proceeds to block 204, wherein the query system 132 extracts keywords from the event in order to generate one or more search queries. The keywords may comprise, for example, words that the user has recently typed, words that occur in a document or buffer, words that are highlighted or selected, words placed into the clipboard, words that are identified as proper names, words that are typed as explicit queries by the user, or may comprise any other type of keyword that the system is able to identify. The keywords may comprise all of the words in the event. The query system 132 may extract keywords from any of a number of data streams. Data streams can comprise, for example, sources of implicit query keywords including one or more of the following: the most recently typed n words where n is on the order of ten; the n words around the user's cursor where n is around ten; words in the current selection; words from the current document (e.g., one such method selects the most frequently occurring words); previous explicit queries executed by the user or submitted by the user; clipboard content; and a list of all the names of people with which the user has communicated; a list of e-mail addresses and/or instant messenger "buddy names"; and a list of important terms or phrases for the user.

Words from a current document can comprise, for example, words from an entire buffer, e.g., an entire Microsoft Word document. In one embodiment, to facilitate performance or, for other benefits, only the first portion of the document may be considered for extracting keywords, e.g., the first 100 kilobytes of data. In another embodiment of the present invention, the query system extracts keywords from explicit queries that are captured by an application on the client 102a, such as a Winsock Layered Service Provider ("LSP"). When the user submits a query to a global index, such as the Google™ search engine, the Winsock LSP captures the query as an event and provides a query, either the original or a modified version, to another search engine application, such as search engine 122 on the client 102a. The local search engine 122 processes the query substantially simultaneously with the global search engine.

Other methods for extracting keywords from data streams may be utilized by an embodiment of the present invention. For example, the query system 132 may use identified terms to generate search queries. An identified term is a term which the user uses in a manner that has been noted as being particularly relevant to the user's contextual state. For instance, an identified term may comprise the name of a person to which the user recently directed an e-mail. The names need not be recent or popular; for example, the names may include all e-mail addresses, etc. captured for a user. Even old, rare names may be useful to identify. For example, if a user has only sent or received a single message to a particular person several years ago, it may still be desirable to recall the message when the sender/recipient e-mail address is recognized. In one embodiment, the names are limited to recent and/or popular names to limit the amount of data required to store the names. To extract the name, the query system 132 can examine the user's e-mail system and determine the names of users to which the user recently or often sends e-mail messages. The query system can extract all names associated with the user's e-mail system, or can extract names based on recipients of an e-mail or names appearing in the e-mail, for example. In another embodiment, the query system also correlates this information with the subject and/or text of e-mail or other correspondence. For example, if a user frequently sends e-mail to a person, and the user also frequently refers to the name of an organization with which the person is affiliated (e.g., the company field of the person's contact information), the query system can identify the organization and content of interest to the person. According to one embodiment, the query system 132 can extract names from a list of contacts comprising, for example, a set of names and associated telephone numbers and e-mails.

In another embodiment, the query system 132 can extract keywords based on identified proper names. The query system 132 can identify proper names, for example, by identifying capitalized words not at the beginning of a sentence. The query system can also search for proper names by crawling articles located on the client device 102a or on the network 106. After determining proper names by crawling articles, the query system 132 can store a list of proper names in the data store 140 or other suitable location. The names can then be used by the query system 132 to identify keywords to extract from an article.

The query system 132 may also extract keywords from a selection or from a clipboard buffer. A selection can comprise, for example, the text or objects that are highlighted in the currently active application. For example, the user 112a can select a portion of text to modify and the query system 132 can extract keywords from the selected or highlighted portion of text. The clipboard buffer can comprise, for example, information that was previously selected and copied or cut by the user 112a.

The query system 132 can also extract keywords based on a list of common words. For example, the query system 132 can extract the following sentence from a text document: "What is the budget for the second quarter of 2003?" Not all the words that appear in this sentence are necessary for a search query. For example, many of the words in the sentence are filler words. Filler words include words such as "the" which are determiners and are not necessarily relevant to any particular query. These words are filtered out before the search query is submitted to the search engine 122. The original sentence may be maintained to compare to future content extracts. According to some embodiments, filtering words can comprise, for example, comparing words to a list of common words. The list of common words can comprise, for example, a list of words determined to appear frequently and be of little value in ranking search results. For example, a list of common words can comprise the words "is," "of," "to," "it," and other common words. The query system 132 can compare words extracted from a string or document to the list of common words and filter out words that appear in the list. In another embodiment, a list can contain common words which are not be excluded as keywords, but which are downweighted. For example, such words can be made less likely to appear as keywords, but may still be selected as keywords if they appear frequently within an article. Additionally, keywords can be associated with keyword ranking scores. Keyword ranking scores can reflect, for example, the relative importance or lack of importance of keywords. For example, common keywords can have low keyword ranking scores associated with them while proper name keywords can have high keyword ranking scores associated with them. The keyword ranking scores can be used in ranking an article containing the keyword ranking scores. For example, articles containing keywords associated with high keyword ranking scores can receive high ranking scores themselves. Likewise, articles containing keywords associated with low keyword ranking scores can receive low ranking scores themselves.

Once the query system 132 has extracted keywords from a data stream, the method 200 proceeds to block 206, wherein the query system 132 generates a search query 206. The search query that the query system 132 generates may comprise keywords extracted from a single data stream or may comprise keywords extracted from multiple streams. For example, the query system 132 can extract keywords from a selected portion of text within a document and from the entire contents of the document. Whether a word extracted from more than one source continues to be used in an implicit query may be determined in various ways. For example, if the word "budget" occurs with some frequency (e.g. fifty times) in a document but the user has not recently typed the word budget, budget may continue to be included in a query generated by the query system 132.

Following block 206, the method 200 proceeds to block 208, wherein the query system 132 transmits the search query to a search engine, for example, search engine 122. In other embodiments, the query system 132 transmits the query to other search engines, for example, a search engine running on a server device 150, such as the Google™ search engine. The search engine 122 performs a search of one or more indices, either local or global, and provides at least one article identifier associated with a relevant article as a result set.

Once the query system 132 transmits the query to a search engine, the method 200 proceeds to block 210, wherein the query system 132 ranks the article identifiers in the result set based on ranking scores. The ranking scores may be related to previous events that were recorded by the query system 132 or another component or may be based on other criteria. For example, the query system 132 can determine ranking scores based at least in part on meta-data associated with articles in the result set. Meta-data can include, for example, bolding, highlighting, underlining, italicizing, font color, heading data, or any other formatting or meta-data associated with a portion of an article. Heading data can comprise, for example, whether a portion of an article is designated as a heading in a text document. The query system 132 can determine the meta-data associated with an article in the result set by determining the meta-data associated with the keywords in the search query. For example, if the search query comprises the terms "budgeting meeting" the query system can identify a result set containing articles comprising the words "budgeting meeting." One such article can be, for example, a spreadsheet with a title "budgeting meeting" appearing in bold. A second such article can be an e-mail with the words "budgeting meeting" appearing in the text. The query system 132 can determine meta-data associated with the keywords "budgeting meeting" in the spreadsheet indicating that the words are bolded. The query system can then boost a ranking score associated with the spreadsheet to reflect the likelihood that the spreadsheet titled "budgeting meeting" is more responsive to the search query than the e-mail simply containing these words in the body of the e-mail.

The query system 132 can further rank the article identifiers based at least in part on capitalization data associated with the articles in the result set. Capitalization data can comprise, for example, data indicating whether one or more letters in a word are capitalized. For example, if the words "budgeting meeting" in the spreadsheet from the example above are capitalized, this is a further indication that they are of greater significance in the article and thus that the article is more closely related to the search query "budgeting meeting." Additionally, capitalized letters can indicate the proper names of people and places. Keywords associated with names and places can be a better indicator that an article containing such keywords is responsive to a search query. For example, if the user types a sentence "meet with Bob Jones for lunch" into an e-mail, the query system 132 can determine key words "meet," "with," "Bob," "Jones," and "lunch" from the sentence. The query system 132 can then identify an article containing the keywords "lunch" and "with" and an article containing the keywords "Bob" and "Jones." The article containing the keywords "Bob" and "Jones" can be more likely to interest the user 112a, and so the query system 132 can rank the identifier associated with the article containing the capitalized words "Bob" and "Jones" higher based at least in part on the capitalization. According to some embodiments, the query system can assign a higher ranking to capitalized keywords that do not begin a sentence as these more likely reflect proper names or places.

Additionally, the query system 132 can determine a ranking score based at least in part on term frequency (TF) and a document frequency (DF) or an inverse document frequency (IDF) associated with a key word. A TF can comprise, for example, the frequency with which a keyword appears in a single article. A DF can comprise, for example, the frequency with which a keyword appears in all documents, and an IDF can comprise, for example, the inverse of the frequency with which the keyword appears in all documents. For example, a common keyword can appear frequently within any one particular document and thus have a high TF. The same common keyword can also appear frequently in all documents and thus have a high DF and consequently a low IDF. By determining a ranking score based on a composite of the TF and IDF, the query system can compensate for keywords appearing frequently in one document when the keywords also appear frequently in all documents. On the other hand a unique keyword that appears a few times in one particular document may have a relatively low TF but can have a very high IDF and thus the composite for such a keyword can be high. According to some embodiments, the query system can determine a ranking score for an identifier in the result set proportional to:

$$\text{Log}(TF+A)/\text{log}(DF+B)$$

Where TF denotes the term frequency of a term, DF denotes the document frequency of a term, A denotes a first constant, and B denotes a second constant.

In one embodiment, A can have the value of 1, and B can have the value of 1. In another embodiment, A can have the value of 0.5, and B can have the value of 0. In yet another embodiment, the logarithm of the DF may not be used, and the DF may be hashed into a lookup table which maps ranges of DF values into constants. Thus the ranking score can be proportional to:

$$\text{Log}(TF+A)/\text{mapping function}(DF)$$

The query system 132 can further determine a ranking score based at least in part on number data associated with articles in the result set. Number data can comprise, for example, whether a keyword comprises numbers. For example if the user 112a types a date into a document, a keyword "2004" can be determined by the query processor 132. The query processor can further determine number data indicating that the keyword "2004" comprises numbers and determine a ranking score for the article containing the keyword "2004" based at least in part on the number data. For example, keywords containing numbers can be less likely to indicate important portions of an article and thus less likely to be associated with search results of interest to the user 112a. Additionally number data can comprise, for example, a number of letters comprising a keyword. For example the query system 132 can determine that a keyword "the" comprises three letters and that a keyword "antidisestablishmentarianism" contains 28 letters. A keyword containing a high number of letters can be more likely to be unique and thus more likely to indicate unique results interesting to the user 112a.

The query system 132 can further determine a ranking score based at least in part on preference data. Preference data can comprise, for example, data indicating the user's 112a preference for a particular article or for a particular file type. In one embodiment, the query system 132 can receive click-through data indicating the user 112a has selected an article identifier displayed in a content display window. The query system 132 evaluates the article identifier to determine a content type associated with the article identifier. The file type may be a web page, e-mail, text file, image, or any other content type. For example, the user 112a can be presented with multiple article identifiers of different types as the result of an implicit query. For example, the user can be presented with e-mails, web pages, and text documents. The user can demonstrate a preference by selecting a particular article type more frequently than any other. For example, the user 112a can select e-mails when presented and ignore results associated with text documents. In this example, the query system 132 can rank subsequent e-mail articles higher to reflect the user's 112a preference for e-mail documents.

In another embodiment, the query system 132 can use the click-through data to adjust the ranking scores both within and across result sets before displaying the combined result set to the user. In another embodiment, the present invention utilizes content type, source, keyword, and other data related to items that the user did not click on. The query system 132 of one such embodiment reduces the relevancy score of article identifiers corresponding to content types and sources that the user has not clicked as frequently as other types of content.

Additionally, the query system 132 can rank article identifiers based on the number of results sets in which the articles are located. For example, the user 112a can view a web page and edit a text document. Four queries are generated from the user context. The first query comprises information from the web page. The second query comprises the last ten words that the user types. The third query comprises the sentence that the user just pasted in the document. And the fourth query comprises the words that the user is currently selecting with the mouse. The query system 132 can submit the queries to one or more search engines and receive four result sets in response. The query system 132 can merge the results and can present the first five article identifiers from the merged result set to the user 112a in a contextual display window for example. The first query can produce a results set comprising articles A, B and C. The second query can produce a result set comprising articles C, D, and E. Because article C appears in both result sets, it can receive a higher ranking score when displayed in the merged results set.

The query system 132 can further determine a ranking score based at least in part on source data. Source data can comprise, for example, data indicating the source of keywords contained in an article. For example, in one embodiment, query results based on keywords extracted from recently typed words receive a higher ranking score than results based on keywords extracted from an entire document.

Source data may further include data indicating the relevancy of a source of keywords. For example, a ranking score can be based on a how frequently the keywords appear in a document, the document frequency of the keywords, or how long an application from which the keywords are extracted has been in the foreground.

Once the query system 132 has received the result set and ranked the results or performed any other operations, the method 200 proceeds to block 212, wherein the query system 132 transmits the result set to the display processor 128 and the display processor 128 causes the output of the article identifiers. The display processor 128 may output the result set in a format similar to a format used for global result sets such as those provided by a search engine utilizing a global index, e.g., Google™ search engine. The display processor 128 may alternatively output the result sets in a small window superimposed over another application that the user is currently using. In one embodiment of the present invention, the display processor 128 creates a window based on the amount of available screen space on the user's 112a display and outputs the result sets from the query system 132 in the window that it created. In another embodiment, the window of an active application may be modified to include the result set.

In one embodiment, once the desired number of results has been retrieved in a result set, the results can be stored in memory and the query system informs the display processor 128. In another embodiment, if the number of results in a result set is less than a pre-determined minimum number, the query system 132 can execute additional queries to retrieve results until the minimum threshold of results has been exceeded. The query system 132 may execute a single query or may execute multiple queries based on multiple data streams in order to return result sets that are relevant to the current user context.

Additionally article identifiers can be presented to the user 112a based on a threshold determined for occurrences of keywords in an article associated with the article identifier. For example, a threshold can be determined to exclude articles from the result set that contain fewer than three occurrences of one or more keywords. Additionally, the display processor 128 can present only those results above a weighted score threshold. For example, the query system 132 can determine a weighted score for each article in a result set. The weighted score can comprise, for example, number of keywords multiplier, a source multiplier, and a time multiplier. The number of keywords multiplier can comprise, for example, a weighting factor based on the number of keywords within a result and a normalizing factor based on a total number of keywords. The normalizing factor can be used to compare results associated with different numbers of keywords. The source multiplier can comprise, for example, a weighting factor based on the source of a keyword.

For example, if a keyword appearing in a first article is highlighted and the same keyword appearing in a second article is not highlighted, the source multiplier can boost a ranking score for the first article. Once a weighted score is determined for an article, the query system 132 can compare the weighted score to a threshold and the display processor 128 can receive this data and present only results exceeding the threshold. For example, the query system can determine two articles associated with a search query and can further determine a weighted score for each article. If the weighted score for the first article is above a threshold value and the weighted score for the second article is below the threshold value, the query system 132 can transmit this data to the display processor 128 and the display processor 128 can present to the user 112a an article identifier associated with the first article and not present an article identifier associated with the second article. Once the article identifiers are presented to the user 112a, the method 200 ends.

General

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method of ranking article identifiers of a result set from an implicit query implied from a user's current context, the method comprising:

receiving an event concerning the user's current context, wherein the event comprises a user interaction with an article having content stored on a local client device, wherein the article is associated with at least one of a plurality of client applications;

analyzing the content of the article associated with the event concerning the user's current context to extract at least one keyword and to identify one or more characteristics of the content of the article, a characteristic comprising highlighting of the content of the article;

generating the implicit query based at least in part on the at least one keyword;

performing a search based at least in part on the implicit query to determine the result set, wherein the result set comprises one or more article identifiers associated with articles relevant to the implicit query; and ranking the article identifiers based at least in part on the one or more characteristics of the content of the article associated with the event concerning the user's current context, wherein the one or more characteristics comprise the identified highlighting of the content of the article associated with the event.

2. The method of claim 1, wherein ranking the article identifiers is based at least in part on a preference of a current user.

3. The method of claim 2, wherein the preference of the current user is based at least in part on click-through data associated with the article identifiers.

4. The method of claim 2, wherein the preference of the current user is based at least in part on file type associated with the article identifiers.

5. The method of claim 1, wherein the one or more characteristics comprise bolding of content within the article.

6. The method of claim 1, wherein ranking the article identifiers is based at least in part on a term frequency and a document frequency.

7. The method of claim 6, wherein ranking the article identifiers comprises determining a rank that is proportional to the log of a sum of a first constant plus the term frequency and inversely proportional to the log of a sum of a second constant plus the document frequency.

8. The method of claim 1, wherein ranking the article identifiers comprises determining a rank that is proportional to the log of a sum of a constant plus a term frequency and inversely proportional to an output of a mapping function that maps ranges of document frequency into constants.

9. The method of claim 1, wherein the one or more characteristics comprise number data associated with the keyword within the article.

10. The method of claim 9, wherein the number data comprises a number of letters in the keyword.

11. The method of claim 9, wherein the number data comprises whether the keyword comprises numbers.

12. The method of claim 1, wherein the one or more characteristics comprise capitalization data associated with content within the article.

13. The method of claim 1, wherein ranking the article identifiers is based at least in part on a number of sources from which the keyword was located.

14. The method of claim 1, wherein ranking the article identifiers is based at least in part on a number of result sets in which the result set appears.

15. The method of claim 1, further comprising:
analyzing the content of the article associated with the event concerning the user's current context to extract a plurality of keywords; and
determining keyword ranking scores for the plurality of keywords.

16. The method of claim 15, wherein ranking the article identifiers is based at least in part on the keyword ranking scores.

17. The method of claim 16, wherein ranking the article identifiers comprises assigning a higher ranking to article identifiers associated with articles containing higher ranked keywords.

18. The method of claim 1, wherein analyzing the content of the article associated with the event concerning the user's current context to extract at least one keyword comprises extracting a keyword from at least one of recently typed words, an entire document, a selected portion of a document, or words surrounding a cursor.

19. The method of claim 1, wherein analyzing the content of the article associated with the event concerning the user's current context to extract at least one keyword from an event comprises determining proper names.

20. The method of claim 19, wherein determining proper names comprises crawling at least one article.

21. The method of claim 1, further comprising:
filtering the result set based on a threshold; and
outputting the article identifiers associated with the filtered result set.

22. The method of claim 21, wherein the threshold comprises a number of keywords.

23. The method of claim 21, wherein the threshold comprises a minimum weighting score based at least in part on one or more of a number of keywords multiplier, a source multiplier, and a time multiplier.

24. The method of claim 1, wherein the article is a document on the client device, and wherein the event comprises an addition of words to the document.

25. The method of claim 1, wherein the article is a document on the client device, and wherein the event comprises a placement of a cursor near words in the document.

26. The method of claim 1, wherein the article is associated with one client application selected from a group consisting of a word processing program, a spreadsheet program, a presentation program, an e-mail program, an instant messenger program, and a database program.

27. The method of claim 1, wherein the one or more characteristics comprise italicizing of content within the article associated with the event.

28. The method of claim 1, wherein the one or more characteristics comprise font color of content within the article associated with the event.

29. The method of claim 1, wherein the one or more characteristics comprise heading data of content within the article associated with the event.

30. The method of claim 1, wherein the at least one keyword is extracted from recently typed words within the article associated with the event.

31. The method of claim 1, wherein the at least one keyword is extracted from a user selected portion within the article associated with the event.

32. The method of claim 1, wherein the at least one keyword is extracted from words surrounding a cursor within the article associated with the event.

33. A computer-readable storage medium containing program code for ranking article identifiers of a result set from an implicit query implied from a user's current context, the program code comprising:
program code for receiving an event concerning the user's current context, wherein the event comprises a user interaction with an article having content stored on a local client device, wherein the article is associated with at least one of a plurality of client applications;
program code for analyzing the content of the article associated with the event concerning the user's current context to extract at least one keyword and to identify one or more characteristics of the content of the article, a characteristic comprising highlighting of the content of the article;
program code for generating the implicit query based at least in part on the at least one keyword;
program code for performing a search based at least in part on the implicit query to determine the result set, wherein the result set comprises one or more article identifiers associated with articles relevant to the implicit query; and
program code for ranking the article identifiers based at least in part on the one or more characteristics of the content of the article associated with the event concerning the user's current context, wherein the one or more characteristics comprise the identified highlighting of the content of the article associated with the event.

34. The computer-readable storage medium of claim 33, wherein ranking the article identifiers is based at least in part on a preference of a current user.

35. The computer-readable storage medium of claim 34, wherein the preference of the current user is based at least in part on click-through data associated with the article identifiers.

36. The computer-readable storage medium of claim 34, wherein the preference of the current user is based at least in part on file type associated with the article identifiers.

37. The computer-readable storage medium of claim 33, wherein the one or more characteristics comprise bolding of content of the article.

38. The computer-readable storage medium of claim 33, wherein ranking the article identifiers is based at least in part on a term frequency and a document frequency.

39. The computer-readable storage medium of claim 38, wherein ranking the article identifiers comprises determining a rank that is proportional to the log of the sum of a first constant plus the term frequency and inversely proportional to the log of the sum of a second constant plus the document frequency.

40. The computer-readable storage medium of claim 33, wherein ranking the article identifiers comprises determining a rank that is proportional to the log of the sum of a constant plus a term frequency and inversely proportional to the output of a mapping function that maps ranges of document frequency into constants.

41. The computer-readable storage medium of claim 33, wherein the one or more characteristics comprise number data associated with the keyword within the article.

42. The computer-readable storage medium of claim 41, wherein the number data comprises a number of letters in the keyword.

43. The computer-readable storage medium of claim 41, wherein the number data comprises whether the keyword comprises numbers.

44. The computer-readable storage medium of claim 33, wherein the one or more characteristics comprise capitalization data associated with content within the article.

45. The computer-readable storage medium of claim 33, wherein ranking the article identifiers is based at least in part on a number of sources from which the keyword was located.

46. The computer-readable storage medium of claim 33, wherein ranking the article identifiers is based at least in part on a number of result sets in which the result set appears.

47. The computer-readable storage medium of claim 33, further comprising program code for:
  analyzing the content of the article associated with the event concerning the user's current context to extract a plurality of keywords; and
  determining keyword ranking scores for the plurality of keywords.

48. The computer-readable storage medium of claim 47, wherein ranking the article identifiers is based at least in part on the keyword ranking scores.

49. The computer-readable storage medium of claim 48, wherein ranking the article identifiers comprises assigning a higher ranking to article identifiers associated with articles containing higher ranked keywords.

50. The computer-readable storage medium of claim 33, wherein analyzing the content of the article associated with the event concerning the user's current context to extract at least one keyword comprises extracting a keyword from at least one of recently typed words, an entire document, a selected portion of a document, or words surrounding a cursor.

51. The computer-readable storage medium of claim 33, wherein analyzing the content of the article associated with the event concerning the user's current context to extract at least one keyword comprises determining proper names.

52. The computer-readable storage medium of claim 51, wherein determining proper names comprises crawling at least one article.

53. The computer-readable storage medium of claim 33, the program code further comprising:
  program code for filtering the result set based on a threshold; and
  program code for outputting the article identifiers associated with the filtered result set.

54. The computer-readable storage medium of claim 53, wherein the threshold comprises a number of keywords.

55. The computer-readable storage medium of claim 53, wherein the threshold comprises a minimum weighting score based at least in part on one or more of a number of keywords multiplier, a source multiplier, and a time multiplier.

56. A method of ranking article identifiers of a result set from an implicit query implied from a user's current context, the method comprising:
  receiving a contextual event concerning the user's current context, the contextual event comprising a user's modification of a file having content stored on a local client device;
  analyzing the content of the file stored on the local client device to extract at least one keyword and to identify one or more characteristics of the content of the file, a characteristic comprising highlighting of the content of the file;
  generating the implicit query based at least in part on the at least one keyword extracted from the file;
  performing a search based at least in part on the implicit query to determine the result set, wherein the result set comprises one or more article identifiers associated with articles comprising the at least one keyword;
  determining a ranking score for the one or more article identifiers based at least in part on the one or more characteristics of the content of the file associated with the contextual event concerning the user's current context, wherein the one or more characteristics comprise the identified highlighting of the content of the file associated with the contextual event; and
  ranking the one or more article identifiers in the result set based on the ranking score.

\* \* \* \* \*